United States Patent
Rofougaran

(10) Patent No.: US 8,064,936 B2
(45) Date of Patent: Nov. 22, 2011

(54) METHOD AND SYSTEM FOR A MULTISTANDARD PROXY

(75) Inventor: Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 913 days.

(21) Appl. No.: 12/039,219

(22) Filed: Feb. 28, 2008

(65) Prior Publication Data

US 2009/0221313 A1 Sep. 3, 2009

(51) Int. Cl.
*H04B 7/00* (2006.01)
*H04B 1/02* (2006.01)
*H03C 7/02* (2006.01)

(52) U.S. Cl. ....... 455/500; 455/101; 455/41.2; 455/41.3

(58) Field of Classification Search ................ 455/41.2, 455/41.3, 500, 69, 101, 59, 67.11, 70, 103, 455/562.1, 575.7; 343/810, 811, 824
See application file for complete search history.

(56) References Cited

U.S. PATENT DOCUMENTS

| | | | |
|---|---|---|---|
| 5,798,567 | A | 8/1998 | Kelly et al. |
| 6,060,433 | A | 5/2000 | Li et al. |
| 7,038,625 | B1 | 5/2006 | Taylor et al. |
| 7,099,678 | B2 * | 8/2006 | Vaidyanathan ............... 455/500 |
| 7,138,884 | B2 | 11/2006 | Cheung |
| 7,247,932 | B1 | 7/2007 | Lin et al. |
| 7,260,424 | B2 | 8/2007 | Schmidt |
| 7,363,017 | B2 | 4/2008 | Miya |
| 2002/0122004 | A1 | 9/2002 | Richards et al. |
| 2004/0041732 | A1 | 3/2004 | Aikawa et al. |
| 2004/0150554 | A1 | 8/2004 | Stenger et al. |
| 2004/0201526 | A1 | 10/2004 | Knowles et al. |
| 2004/0204103 | A1 | 10/2004 | Rouphael |
| 2004/0222506 | A1 | 11/2004 | Wei et al. |
| 2005/0012675 | A1 | 1/2005 | Sakiyama et al. |
| 2005/0212642 | A1 | 9/2005 | Pleskach et al. |
| 2005/0237237 | A1 | 10/2005 | Lust et al. |
| 2006/0033671 | A1 | 2/2006 | Chan et al. |
| 2006/0077102 | A1 | 4/2006 | Mohamadi |

(Continued)

FOREIGN PATENT DOCUMENTS

CN 1716695 1/2006

(Continued)

OTHER PUBLICATIONS

European Search Report for European Patent Application No. 08020760.8-2220, mailed May 19, 2009.

*Primary Examiner* — Eugene Yun
(74) *Attorney, Agent, or Firm* — McAndrews, Held & Malloy, Ltd.

(57) ABSTRACT

Aspects of a method and system for a multistandard proxy may include establishing a microwave communication link between a wireless portable storage device and a wireless transmitter and/or wireless receiver via a secondary wireless link. Beamforming parameters of a first antenna array coupled to the wireless portable storage device and a second antenna array coupled to the wireless transmitter and/or wireless receiver may be adjusted based on data received via the secondary wireless link. The wireless portable storage and the wireless transmitter and/or wireless receiver may exchange data via the first antenna array and the second antenna array. A secondary wireless link may be established to transmit setup data for the microwave communication link. The secondary wireless link may be established via a Bluetooth and/or WAN protocol.

20 Claims, 4 Drawing Sheets

U.S. PATENT DOCUMENTS

| | | |
|---|---|---|
| 2006/0092079 A1 | 5/2006 | de Rochemont |
| 2006/0152911 A1 | 7/2006 | Humbert et al. |
| 2006/0235958 A1 | 10/2006 | Motoyama |
| 2007/0013051 A1 | 1/2007 | Heyan et al. |
| 2007/0205748 A1 | 9/2007 | Abou |
| 2008/0178241 A1 | 7/2008 | Gilboy |
| 2008/0291115 A1 | 11/2008 | Doan et al. |
| 2009/0153421 A1 | 6/2009 | Rofougaran et al. |
| 2009/0153427 A1 | 6/2009 | Rofougaran |
| 2009/0153428 A1 | 6/2009 | Rofougaran et al. |
| 2009/0179814 A1 | 7/2009 | Park et al. |
| 2009/0189064 A1 | 7/2009 | Miller et al. |
| 2009/0221313 A1 | 9/2009 | Rofougaran |
| 2010/0090902 A1 | 4/2010 | Thompson et al. |

FOREIGN PATENT DOCUMENTS

| | | |
|---|---|---|
| EP | 1 146 592 | 10/2001 |
| KR | 20050065395 | 6/2005 |
| KR | 20060087503 | 8/2006 |
| WO | WO9621255 A1 | 7/1996 |
| WO | WO 2007/114620 | 10/2007 |

* cited by examiner

METHOD AND SYSTEM FOR A MULTISTANDARD PROXY

CROSS-REFERENCE TO RELATED APPLICATIONS/INCORPORATION BY REFERENCE

Not applicable.

FIELD OF THE INVENTION

Certain embodiments of the invention relate to signal processing for communication systems. More specifically, certain embodiments of the invention relate to a method and system for a multistandard proxy.

BACKGROUND OF THE INVENTION

Electronic communication has become prolific over the last decade. While electronic communication was initially limited to the desktop, recent trends have been to make communications, media content and the Internet available anytime, anywhere and, increasingly, on any device. Already now, it is quite common to find mobile devices such as cellular phones or Personal Digital Assistants (PDAs) that incorporate a large range of communication technologies and associated software. For example, fully-featured web-browsers, email clients, MP3 players, instant messenger software, and Voice-over-IP may all be found on some recent devices.

Currently, there are many different communication technologies and protocols, some of which may utilize common data formats and while others may utilize different data formats. Today's mobile communication devices have to support these man different communication technologies, protocols and/or data formats.

As the number of electronic devices enabled for wireline and/or mobile communications continues to increase, significant efforts exist with regard to making such devices smaller and lighter. In this regard, designers find themselves in a never ending quest to include more functionality in less space. However, shrinking device and technology sizes leads to a multitude of design issues.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for a multistandard proxy, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a multistandard proxy. Aspects of a method and system for a multistandard proxy may comprise establishing a microwave communication link between a wireless portable storage device and a wireless transmitter and/or wireless receiver via a secondary wireless link. Beamforming parameters of a first antenna array coupled to the wireless portable storage device and a second antenna array coupled to the wireless transmitter and/or wireless receiver may be adjusted based on data received via the secondary wireless link. The wireless portable storage and the wireless transmitter and/or wireless receiver may exchange data via the first antenna array and the second antenna array.

A secondary wireless link may be established to transmit setup data for the microwave communication link. The secondary wireless link may be established via a Bluetooth and/or WAN protocol. The wireless portable storage and the wireless transmitter and/or wireless receiver may receive and transmit in the 60 GHz frequency band. The first antenna array and/or the second antenna array may be located on a casing, within an integrated circuit package, or within an integrated circuit of the wireless portable storage. The wireless portable storage and/or the wireless transmitter and/or receiver may be located within a laptop, a personal computer, a mobile telephone, a Personal Digital Assistant (PDA), a set-top box, and/or a multi-media device. The first antenna array and the second antenna array may comprise one or more antennas, and the beamforming parameters may be adjusted to optimize a communication link performance metric.

Figure 1:
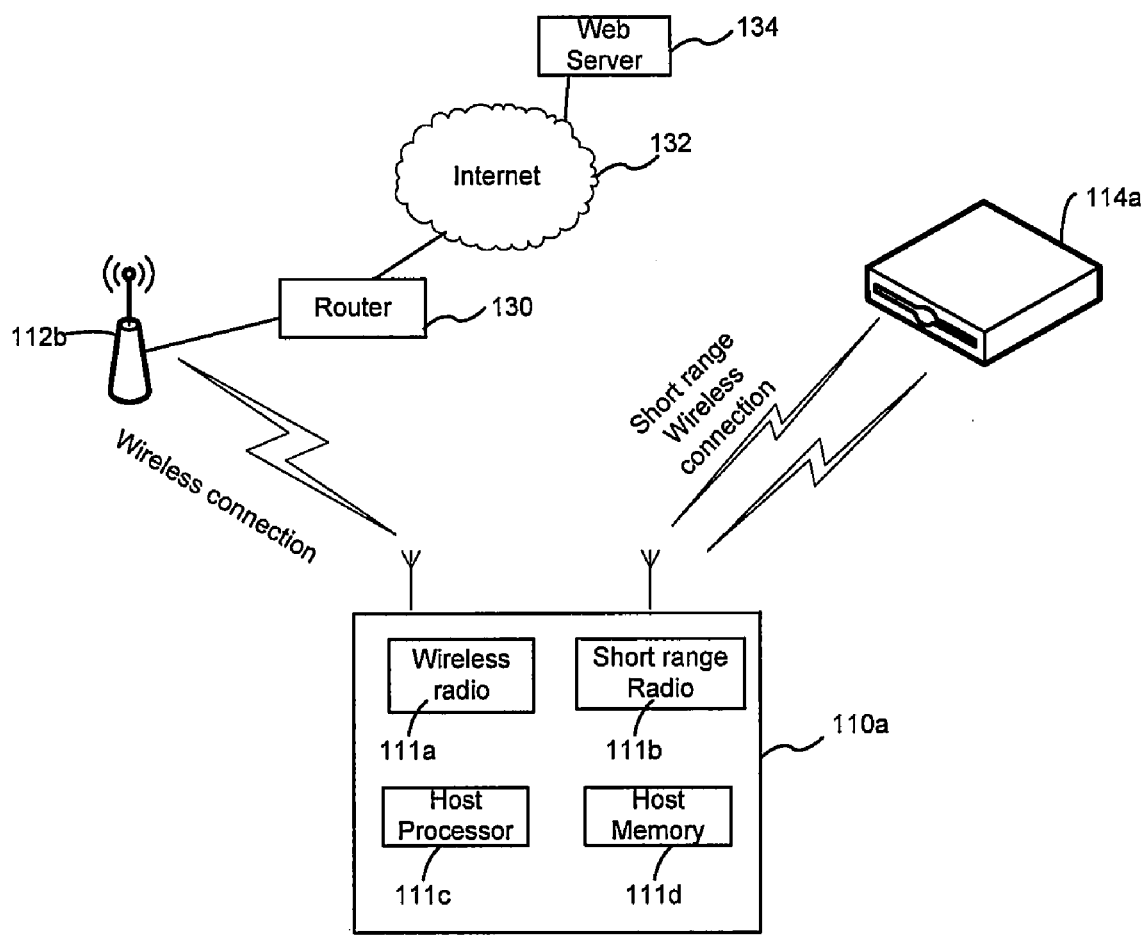
FIG. 1 is a diagram illustrating an exemplary wireless communication system comprising a multistandard proxy, in accordance with an embodiment of the invention.

FIG. 1 is a diagram illustrating an exemplary wireless communication system comprising a multistandard proxy, in accordance with an embodiment of the invention. Referring to FIG. 1, there is shown an access point 112b, a computer 110a, a portable storage 114a, a router 130, the Internet 132 and a web server 134. The computer or host device 110a may comprise a wireless radio 111a, a short-range radio 111b, a host processor 111c, and a host memory 111d. There is also shown a wireless connection between the wireless radio 111a and the access point 112b, and a plurality of short-range wireless connections between the short-range radio 111b and the portable storage 114a.

The access point 112b may comprise suitable logic, circuitry and/or code that may be enabled to transmit and receive radio frequency signals for data communications, for example with the wireless radio 111a. The access point 112b may also be enabled to communicate via a wired network, for example, with the router 130. The wireless radio 111a may comprise suitable logic, circuitry and/or code that may enable communications over radio frequency waves with one or more other radio communication devices. The wireless radio 111a and the access point 112b may be compliant with one or more mobile communication standard, for example, GSM, UMTS, and/or CDMA2000.

The short range radio 111b may comprise suitable logic, circuitry and/or code that may enable communications over radio frequencies with one or more other communication devices, for example the portable storage 114a. The short range radio 111b may be enabled to operate a plurality of communication links concurrently. The short range radio 111b and/or the portable storage 114a may be compliant with a wireless industry standard, for example, Bluetooth and/or IEEE 802.11 Wireless LAN.

The host processor 111c may comprise suitable logic, circuitry and/or code that may be enabled to generate and process data. The host memory 111d may comprise suitable logic, circuitry and/or code that may be enabled to store and retrieve data for various system components and functions of the computer 110a.

The router 130 may comprise suitable logic, circuitry and/or code that may be enabled to communicate with communication devices that may be communicatively coupled to it, for example access point 112b or the Internet 132.

The Internet 132 may comprise suitable logic, circuitry and/or code that may be enabled to interconnect and exchange data between a plurality of communication devices. The web server 134 may comprise suitable logic, circuitry and/or code that may be enabled to communicate with communication devices that may be communicatively coupled to it, for example the Internet 132.

Frequently, computing and communication devices may comprise hardware and software that may enable communication using multiple wireless communication standards and/or protocols. There may be instances when the wireless radio 111a and the short-range radio 111b may be active concurrently. For example, it may be desirable for a user of the computer or host device 110a to access the Internet 132 in order to consume streaming content from the Web server 134. Accordingly, the user may establish a wireless connection between the computer 110a and the access point 112b. Once this connection is established, the streaming content from the Web server 134 may be received via the router 130, the access point 112b, and the wireless connection, and consumed by the computer or host device 110a.

It may further be desirable for the user of the computer 110a to access data from the portable storage 114a. Accordingly, the user of the computer 110a may establish a short-range wireless connection with the portable storage 114a. When the short-range wireless connection is established, and with suitable configurations on the computer 110a enabled, data may be transferred from/to the portable storage 114a. In some instances, the data link between the portable storage 114a and the computer 110a may be enabled for high data rates and may comprise, for example, 60 GHz communications technology.

Figure 2A:
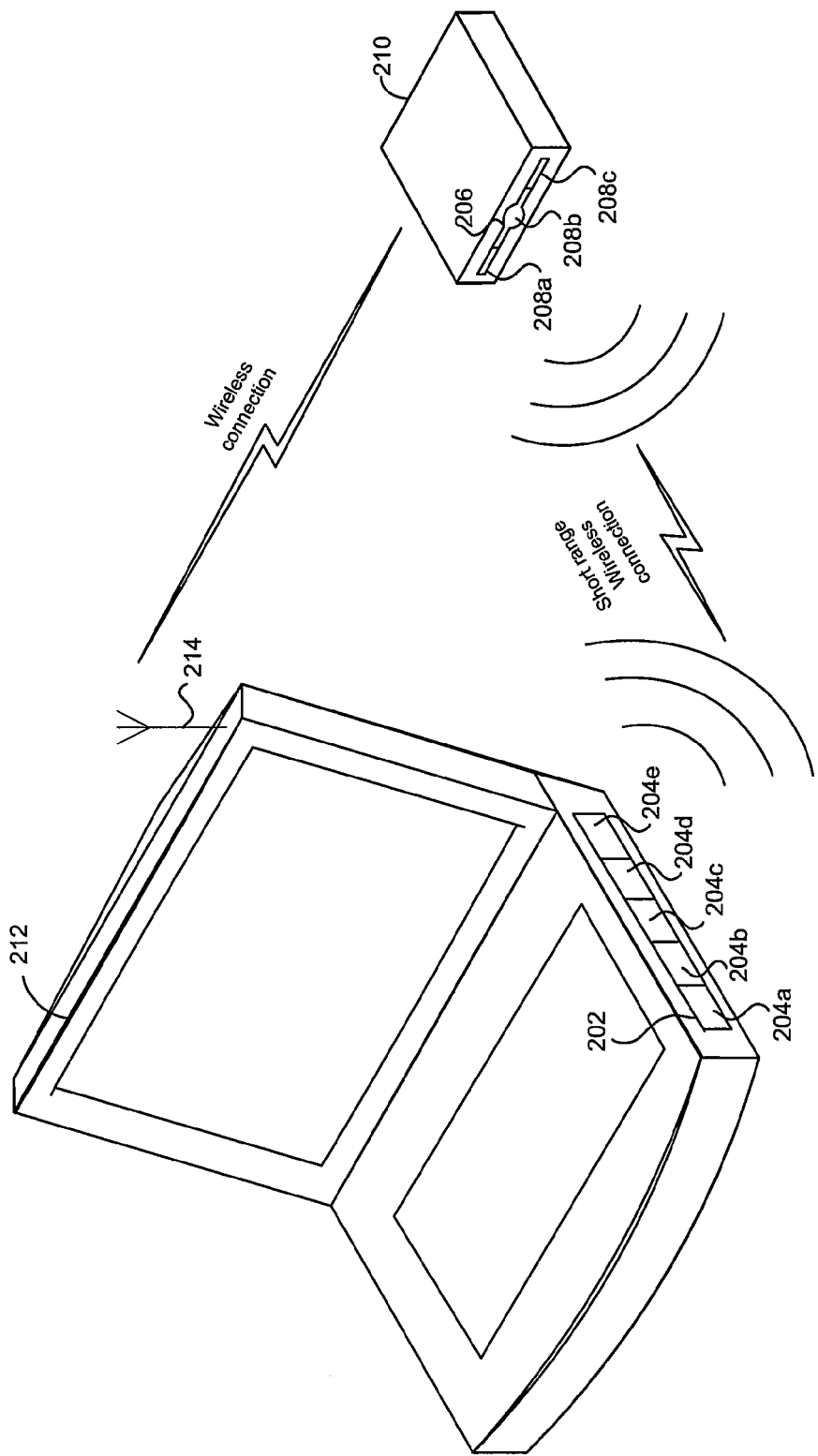
FIG. 2A is a diagram illustrating an exemplary high-rate wireless data link, in accordance with an embodiment of the invention.

FIG. 2A is a diagram illustrating an exemplary high-rate wireless data link, in accordance with an embodiment of the invention. Referring to FIG. 2A, there is shown a computer 212 and a portable storage 210.

The computer 212 may comprise an antenna 214, and an antenna array 202, comprising one or more antennas, of which antennas 204a, 204b, 204c, 204d, and 204e may be illustrated. The computer 212 may be substantially similar to the computer 110a, for example. The computer 212 may be, for example, a laptop, a personal computer, a mobile telephone, a Personal Digital Assistant (PDA), a set-top box, a multi-media device, or any other device that may require short-range data transfer. Hence, the computer 212 may comprise suitable logic, circuitry and/or code that may be enabled to transmit and receive data via a plurality of communication links.

The portable storage 210 may comprise suitable logic, circuitry and/or code that may be enabled to transmit and receive data via a plurality of communication links. The portable storage 210 may comprise an antenna array 206, comprising one or more antennas, of which antennas 208a, 208b and 208c may be illustrated. The portable storage 210 may be substantially similar to the portable data storage 114a. The portable storage 210 may be, for example, a laptop, a personal computer, a mobile telephone, a Personal Digital Assistant (PDA), a set-top box, a multi-media device, or any other device that may require short-range data transfer and that may store data in its memory. In various exemplary embodiments of the invention, the casing of the portable storage 210a may be constructed from a suitable material that may be permeable by radio waves at desirable frequencies, for example at 60 GHz.

The 60 GHz communication links may enable short-range communications between a computer 212 and a portable storage 210 because they may permit very high data transfer rates, due to the large available bandwidth for communications. In addition, 60 GHz communications may be enabled using antennas of small physical dimensions, which may be placed on the casing of the communicating devices, for example the computer 212 and/or the portable storage 210. In accordance with an embodiment of the invention, a 60 GHz communication link may be established by the computer 212 or the portable storage 210 via a secondary link, for example a Bluetooth or WLAN link. In accordance with various embodiments of the invention, the secondary link that may be used, for example, for setting up the primary wireless link may not be restricted to Bluetooth and/or WLAN but may be any appropriate communication standard. The computer 212 and the portable storage 210 may comprise suitable logic, circuitry and/or code that may be enabled to dynamically and/or automatically setup and configure a desirable communications link via a secondary communications link, for example from antenna 214 to the portable storage 210. For example, antenna 214 may transmit setup data for a primary communications link to the portable storage 210, and the antenna array 202 on the computer 212 may be enabled to steer the transmission/reception beam of the primary link in a desirable direction. Because of the high operating frequency at 60 GHz, path loss may be significant even over short transmission distances. Hence, in some instances, it may be desirable to use the antenna array 202 to generate, for example, a signal beam. A signal beam may increase the directivity of the transmitted and/or received signal in a desirable direction and may focus the signal energy, thus providing increased signal power in certain directions and improved Signal-to-Interference-plus-Noise-Ratio (SINR). The beam forming pattern at the antenna array 202 and/or 206, for example, may be adjusted by phase-shifting and weighing the signals that may be fed to the antenna elements, for example 204a, . . . , 204e and/or 208a, . . . , 208c.

Figure 2B:
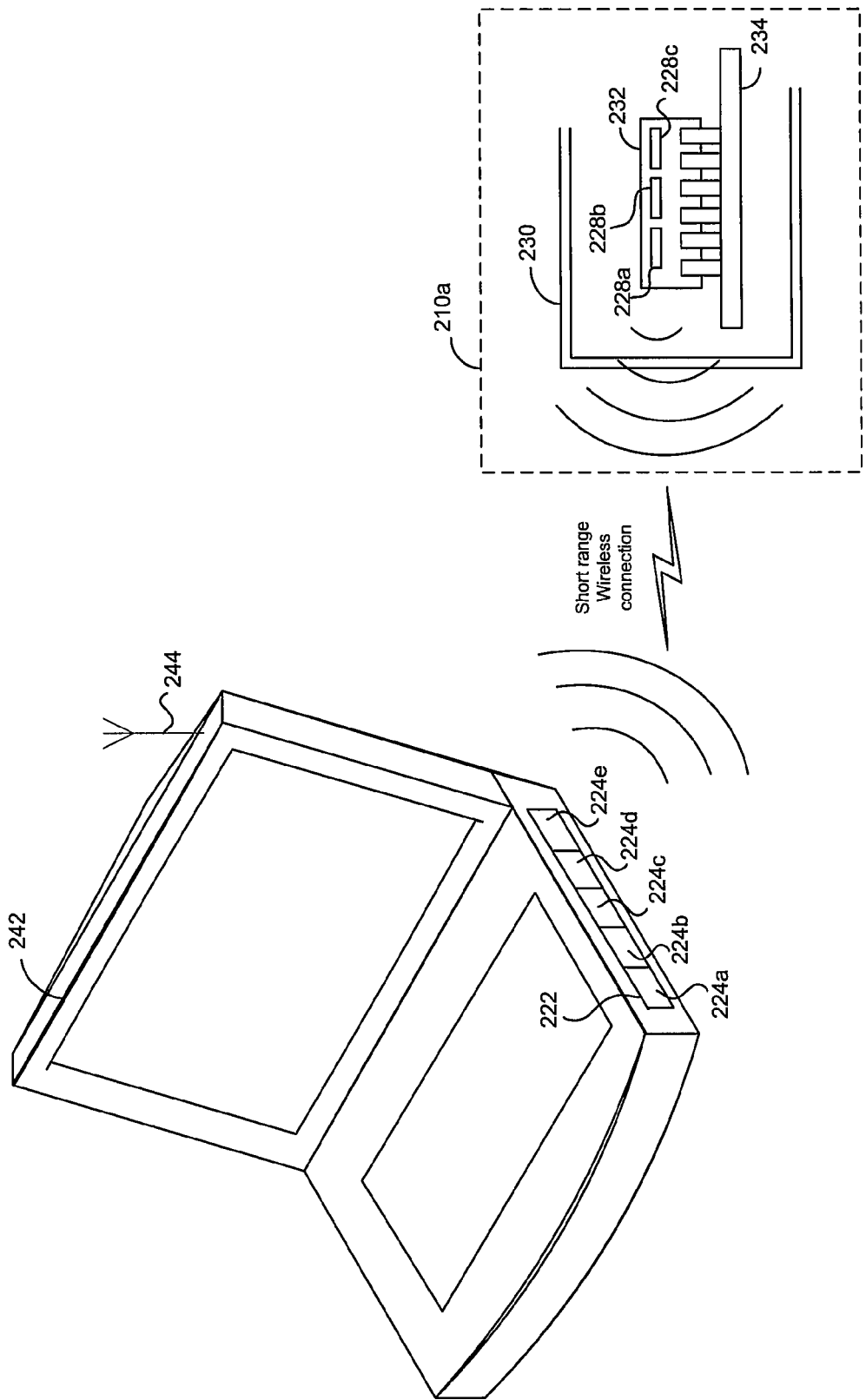
FIG. 2B is a diagram illustrating an exemplary high-rate wireless data link with a chip-based antenna array, in accordance with an embodiment of the invention.

FIG. 2B is a diagram illustrating an exemplary high-rate wireless data link with a chip-based antenna array, in accordance with an embodiment of the invention. Referring to FIG. 2B, there is shown a computer 242 comprising an antenna 244, and an antenna array 222. There is also shown a portable storage 210a. The portable storage 210a may comprise a casing 230, one or more printed circuit boards (PCBs) 234, and one or more integrated circuits (ICs), of which IC 232 may be illustrated. The IC 232 may comprise one or more antennas, of which antennas 228a, 228b and 228c may be illustrated.

The antenna array 222 may comprise one or more antennas, of which antennas 224a, 224b, 224c, 224d, and 224e may be illustrated.

The computer 242, the antenna 244, the antenna array 222, and the antennas 224a through 224e may be substantially similar to the computer 212, the antenna 214, the antenna array 202, and the antennas 204a through 204e, respectively. The computer 242 and the portable storage 210a may comprise suitable logic, circuitry and/or code that may be enabled to setup and configure a desirable communications link via a Bluetooth or WLAN interface, as described for FIG. 2A. For example, the antenna array comprising antennas 228a, 228b, and 228c, for example, on the portable storage 210a, and the antenna array 222 on the computer 242 may be enabled to steer the transmission/reception beam in a desired direction, as described for FIG. 2A.

The casing 230 of the portable storage 210a may be constructed from a suitable material, for example, that may be permeable by radio waves at desirable frequencies, for example at 60 GHz. The IC 232 may comprise suitable logic, circuitry and/or code that may be enabled to generate and/or process radio frequency signals for reception and/or transmission via the one or more antennas, of which antennas 228a, 228b and 228c may be illustrated.

The antennas 228a, 228b, and 228c may be used together to form an antenna array, similar to antenna array 206. The antennas 228a, 228b and 228c may be implemented on the package of the IC 232 and/or directly on the IC 232.

Similar to FIG. 2A, in accordance with an embodiment of the invention, the communication link may be established by the computer 242 or the portable storage 210a, via a secondary communications link, for example via antenna 244.

The 60 GHz communication links may enable short-range communications between a computer 242 and a portable storage 210a because they may permit very high data transfer rates, due to the large available bandwidth for communications. In addition, 60 GHz communications may be enabled using antennas of small physical dimensions, which may be placed on the casing of the communicating devices, for example the computer 242 and/or the portable storage 210a. In accordance with an embodiment of the invention, a 60 GHz communication link may be established by the computer 242 or the portable storage 210a via a secondary link, for example a Bluetooth or WLAN link. In accordance with various embodiments of the invention, the secondary link that may be used, for example, for setting up the primary wireless link may not be restricted to Bluetooth and/or WLAN but may be any appropriate communication standard. The computer 242 and the portable storage 210a may comprise suitable logic, circuitry and/or code that may be enabled to dynamically and/or automatically setup and configure a desirable communications link via a secondary communications link, for example from antenna 244 to the portable storage 210a. For example, antenna 244 may transmit setup data for a primary communications link to the portable storage 210a, and an antenna array comprised in computer 210a may be enabled to steer the transmission/reception beam of the primary link in a desirable direction. Because of the high operating frequency at 60 GHz, path loss may be significant even over short transmission distances. Hence, in some instances, it may be desirable to use an antenna array, for example comprising antennas 228a, 228b, 228c and antenna array 222 to generate, for example, one or more signal beams. A signal beam may increase the directivity of the transmitted and/or received signal in a desirable direction and may focus the signal energy, thus providing increased signal power in certain directions and improved Signal-to-Interference-plus-Noise-Ratio (SINR).

Figure 3:
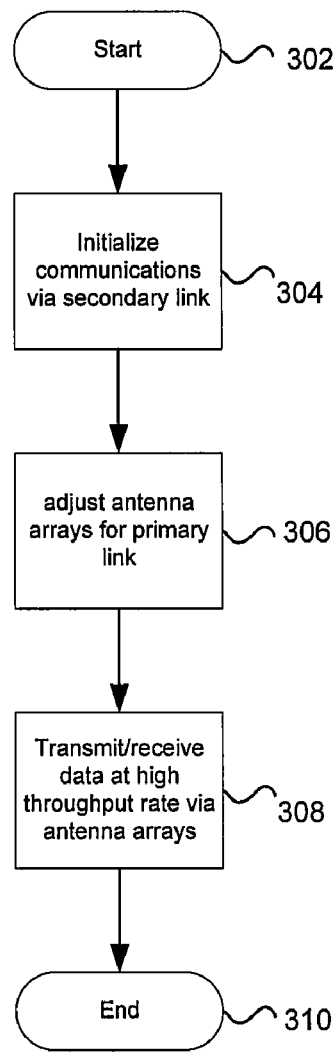
FIG. 3 is a flowchart illustrating an exemplary multi-frequency antennas system, in accordance with an embodiment of the invention.

FIG. 3 is a flow chart illustrating an exemplary communication setup, in accordance with an embodiment of the invention, in accordance with an embodiment of the invention. The communication setup process may be initialized in step 302. In step 304, the initial communications setup may be established, for example between the computer 212 and the portable storage 210 via a secondary communications link. In accordance with various embodiments of the invention, the initialization of the communication over a primary communications link may be achieved via a secondary link, for example by Bluetooth, or over a WLAN link, as described for FIG. 2A and FIG. 2B. In step 306, after the connection setup has been established, the 60 GHz antenna arrays may adjust their beam patterns in order to communicate via the primary link, for example via antenna array 202 and antenna array 206. In step 308, the transmission and reception of the primary link of the data through the antenna arrays may take place. In some cases, for example in the case of non-stationary transceivers, the beam may be dynamically adjusted during the data transmission.

In accordance with an embodiment of the invention, a method and system for a multistandard proxy may comprise establishing a microwave communication link between a wireless portable storage device, for example portable storage 210, and a wireless transmitter and/or wireless receiver, for example computer 212, via a secondary wireless link. Beamforming parameters of a first antenna array, for example antenna array 206, coupled to the wireless portable storage device 210 and a second antenna array 202 coupled to the wireless transmitter and/or wireless receiver, for example computer 212 may be adjusted based on data that may be received via the secondary wireless link. The wireless portable storage 210 and the wireless transmitter and/or wireless receiver, for example computer 212 may exchange data via the first antenna array 206 and the second antenna array 202.

A secondary wireless communication link may be established to transmit setup data for the microwave communication link, as described for FIG. 2A and FIG. 2B. The secondary wireless link may be established via Bluetooth and/or WLAN protocol. The wireless portable storage, for example the portable storage 210a, and the wireless transmitter and/or wireless receiver, for example the computer 242, may receive and transmit in the 60 GHz frequency band. The first antenna array, for example the antenna array comprising antennas 228a, 228b, and 228c, and/or the second antenna array may be located on a casing, within an integrated circuit package, or within an integrated circuit of the wireless portable storage, as illustrated in FIG. 2B. The wireless portable storage and/or the wireless transmitter and/or receiver may be located within a laptop, a personal computer, a mobile telephone, a Personal Digital Assistant (PDA), a set-top box, and a multi-media device. The first antenna array and the second antenna array may comprise one or more antennas, and the beamforming parameters may be adjusted to optimize a communication link performance metric, as shown in FIG. 2A and FIG. 2B.

Another embodiment of the invention may provide a machine-readable storage, having stored thereon, a computer program having at least one code section executable by a machine, thereby causing the machine to perform the steps as described above for a method and system for a multistandard proxy.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embodied in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
    in a device comprising a wireless transmitter and/or a wireless receiver:
        establishing a secondary wireless communication link with a wireless portable storage device;
        communicating, via said secondary wireless communication link, beamforming parameters for configuring an antenna array of said wireless portable storage device and an antenna array of said wireless transmitter and/or wireless receiver;
        configuring said antenna array of said wireless transmitter and/or wireless receiver utilizing said beamforming parameters;
        establishing a primary wireless communication link between said configured antenna array of said wireless portable storage device and said configured antenna array of said wireless transmitter and/or wireless receiver; and
        exchanging data between said wireless portable storage and said wireless transmitter and/or wireless receiver via said established primary wireless communication link.

2. The method according to claim 1, comprising communicating setup data utilized for said establishing of said primary wireless communication link via said established secondary wireless communication link.

3. The method according to claim 2, wherein said established secondary wireless communication link utilizes Bluetooth and/or WLAN protocols.

4. The method according to claim 1, wherein said established primary wireless communication link operates in the 60 GHz frequency band.

5. The method according to claim 1, wherein said antenna array of said wireless portable storage device is located on a casing, within an integrated circuit package, or within an integrated circuit of said wireless portable storage device.

6. The method according to claim 1, wherein said antenna array of said wireless transmitter and/or wireless receiver is located on a casing, within an integrated circuit package, or within an integrated circuit of said wireless transmitter and/or wireless receiver.

7. The method according to claim 1, wherein said wireless portable storage is located within a laptop, a personal computer, a mobile telephone, a Personal Digital Assistant (PDA), a set-top box, and/or a multi-media device.

8. The method according to claim 1, wherein said wireless transmitter and/or wireless receiver is located within a laptop, a personal computer, a mobile telephone, a Personal Digital Assistant (PDA), a set-top box, and/or a multi-media device.

9. The method according to claim 1, wherein each of said antenna array of said portable storage device and said antenna array of said wireless transmitter and/or said wireless receiver comprise a plurality of antennas.

10. The method according to claim 1, comprising adjusting said beamforming parameters to optimize a performance metric of said primary wireless communication link.

11. A system comprising:
    one or more circuits for use in a wireless device comprising a wireless transmitter and/or a wireless receiver, said one or more circuits are enabled to:
        establish a secondary wireless communication link with a wireless portable storage device;
        communicate, via said secondary wireless communication link, beamforming parameters for configuring an antenna array of said wireless portable storage device and an antenna array of said wireless transmitter and/or wireless receiver;
        configure said antenna array of said wireless transmitter and/or wireless receiver utilizing said beamforming parameters;
        establish a primary wireless communication link between said configured antenna array of said wireless portable storage device and said configured antenna array of said wireless transmitter and/or wireless receiver; and
        exchange data between said wireless portable storage and said wireless transmitter and/or wireless receiver via said established primary wireless communication link.

12. The system according to claim 11, wherein said one or more circuits communicate setup data utilized for said establishing of said established primary wireless communication link via said secondary wireless communication link.

13. The system according to claim 12, wherein said established secondary wireless communication link utilizes Bluetooth and/or WLAN protocols.

14. The system according to claim 11, wherein said established primary wireless communication link operates in the 60 GHz frequency band.

15. The system according to claim 11, wherein said antenna array of said wireless portable storage device is located on a casing, within an integrated circuit package, or within an integrated circuit of said wireless portable storage.

16. The system according to claim 11, wherein said antenna array of said wireless transmitter and/or wireless receiver is located on a casing, within an integrated circuit package, or within an integrated circuit of said wireless transmitter and/or wireless receiver.

17. The system according to claim 11, wherein said wireless portable storage is located within a laptop, a personal computer, a mobile telephone, a Personal Digital Assistant (PDA), a set-top box, and/or a multi-media device.

18. The system according to claim 11, wherein said wireless transmitter and/or wireless receiver is located within a laptop, a personal computer, a mobile telephone, a Personal Digital Assistant (PDA), a set-top box, and/or a multi-media device.

19. The system according to claim 11, wherein each of said antenna array of said portable storage device and said antenna array of said wireless transmitter and/or wireless receiver comprise a plurality of antennas.

20. The system according to claim 11, wherein said one or more circuits adjust said beamforming parameters to optimize a performance metric of said primary wireless communication link.

* * * * *